United States Patent [19]

Dandridge et al.

[11] Patent Number: 5,394,378
[45] Date of Patent: Feb. 28, 1995

[54] HYDROPHONE TRANSDUCTION MECHANISM

[75] Inventors: Anthony Dandridge, Burke; Aileen M. Yurek, Alexandria, both of Va.; Alan B. Tveten, Fort Washington, Md.

[73] Assignee: The United States of America as represented by the Secretary of the Navy, Washington, D.C.

[21] Appl. No.: 78,887

[22] Filed: Jun. 21, 1993

[51] Int. Cl.6 .................. H04R 23/00; G01B 9/02
[52] U.S. Cl. ................................ 367/149; 356/345
[58] Field of Search ................ 367/149, 140, 141; 356/345

[56] References Cited

U.S. PATENT DOCUMENTS

| | | | |
|---|---|---|---|
| 4,893,930 | 1/1990 | Garrett et al. | 356/345 |
| 4,994,668 | 2/1991 | Lagakos et al. | 250/22 |
| 5,140,559 | 8/1992 | Fisher | 367/149 |
| 5,155,548 | 10/1992 | Danver et al. | 356/345 |
| 5,253,222 | 10/1993 | Danver et al. | 367/149 |
| 5,256,237 | 10/1993 | Maas et al. | 367/149 |

OTHER PUBLICATIONS

Publication, "Planar Flexible FIber-Optic Acoustic Sensors", by N. Lagakos et al., *Journal of Lightwave Technology*, vol. 8, No. 9, pp. 1298–1303 (Sep. 1990).
Publication, "High Frequency Response of Fiber-Optic Planar Acoustic Sensors", by J. A. Bucaro et al., *Journal of Lightwave Technology*, vol. 9, No. 9, pp. 1195–1199 (Sep. 1991).

*Primary Examiner*—Ian J. Lobo
*Attorney, Agent, or Firm*—Thomas E. McDonnell; George Jameson

[57] ABSTRACT

A sensing portion for an interferometric planar hydrophone is disclosed which comprises: a support assembly; a plurality of hollow compliant mandrels mounted to the support assembly in a fixed planar relationship with respect to each other to form a planar configuration; a sensing optical fiber sequentially wound around each of the plurality of mandrels to form a single, serial, optical sensing arm or path between an input position on a first one of the plurality of mandrels and an output position on a last one of the plurality of mandrels; and an acoustically transparent material encapsulating the sensing portion to form a sealed compliant planar hydrophone. In an operational system, an interferometric planar hydrophone is disclosed which comprises: the sensing portion in which the sensing arm is operative to measure a predetermined measurand in a preselected environment and which sensing portion further includes a reference optical fiber environmentally isolated from the predetermined measurand; a light source for transmitting coherent light to both of the sensing and reference optical fibers; and circuitry responsive to light received from the sensing and reference optical fibers for developing an output signal indicative of phase shift differences between the sensing and reference optical fibers to determine the predetermined measurand.

21 Claims, 4 Drawing Sheets

HYDROPHONE TRANSDUCTION MECHANISM

FIELD OF THE INVENTION

The present invention relates to large area conformal hydrophones and particularly to a new transduction mechanism for large area planar conformal hydrophones.

DESCRIPTION OF THE RELATED ART

Hull- or seawall-mounted acoustic arrays require that the hydrophone elements have a height less than their area. Hence planar hydrophones are desired. Previous designs of planar hydrophones have used the encapsulation material, which is generally some type of polyurethane, as the acoustic transduction mechanism (the mechanism which responds to the acoustic signals impinging upon them). The expansion or compression of the polyurethane matrix stretches or compresses the optical fiber embedded in it, changing the phase of the light passing through the optical fiber. The phase shift is detected with a fiber optic interferometer and analyzed electronically at the interferometer output. This transduction mechanism is generally temperature dependent and, thus, the acoustic sensitivity of these designs also varies with temperature. Temperature dependence of the sensitivity is unacceptable in a hydrophone design. Another problem with using the encapsulation material as the transduction mechanism is that the acoustic sensitivity is a bulk modulus response. This leads to an unacceptably high sensitivity to acceleration in some of these devices.

SUMMARY OF THE INVENTION

It is therefore an object of the invention to provide a new transduction mechanism for large area planar conformal hydrophones.

Another object of the invention is to provide an improved, highly sensitive, interferometric planar hydrophone.

Another object of the invention is to provide a single planar hydrophone comprised of a plurality of air-filled compliant mandrels onto which a sensing optical fiber is sequentially wound to form a single, serial, optical sensing arm of the hydrophone.

A further object of the invention is to provide a conformal array of interferometric planar hydrophones with each hydrophone being comprised of a sensing portion which includes a sensing optical fiber sequentially wound around each of a plurality of gas-filled mandrels to form a single sensing arm of an associated interferometer.

These and other objects of this invention are achieved by providing a sensing portion for an interferometric planar hydrophone which comprises: a support assembly; a plurality of hollow compliant mandrels mounted to the support assembly in a fixed planar relationship with respect to each other to form a planar configuration; a sensing optical fiber sequentially wound around each of the plurality of mandrels to form a single, serial, optical sensing arm or path between an input position on a first one of the plurality of mandrels and an output position on a last one of the plurality of mandrels; and an acoustically transparent material encapsulating the sensing portion to form a sealed compliant planar hydrophone.

In an operational system, an interferometric planar hydrophone is disclosed which comprises: the sensing portion in which the sensing arm is operative to measure a predetermined measurand in a preselected environment and which sensing portion further includes a reference optical fiber environmentally isolated from the predetermined measurand; a light source for transmitting coherent light to both of the sensing and reference optical fibers; and circuitry responsive to light received from the sensing and reference optical fibers for developing an output signal indicative of phase shift differences between the sensing and reference optical fibers to determine the predetermined measurand.

BRIEF DESCRIPTION OF THE DRAWINGS

These and other objects, features and advantages of the invention, as well as the invention itself, will become better understood by reference to the following detailed description when considered in connection with the accompanying drawings wherein like reference numerals designate identical or corresponding parts throughout the several views and wherein.

DETAILED DESCRIPTION OF THE INVENTION

Figure 1:
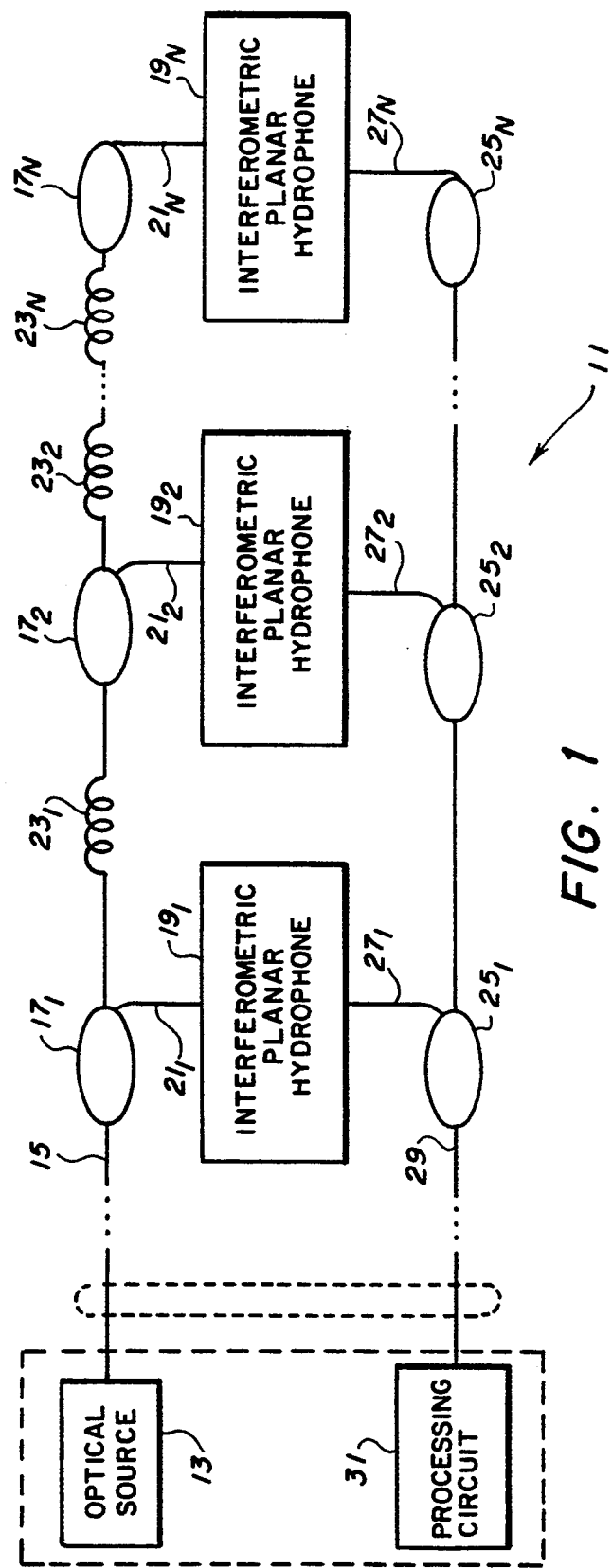
FIG. 1 illustrates the interferometric planar fiber optic hydrophone system of the invention.

Referring now to the drawings, FIG. 1 illustrates an interferometric planar hydrophone system 11 of the invention. An optical source 13, such as a laser, launches coherent light into an input optical fiber 15, with predetermined portions of the power in the light being respectively tapped off by a series of optical couplers $17_1$, $17_2$ - - - $17_N$ disposed in preselected positions along the input optical fiber 15. A group of interferometric planar hydrophones $19_1$, $19_2$ - - - $19_N$ is respectively coupled to the optical couplers $17_1$, $17_2$ - - - $17_N$ by way of respective connecting optical fibers $21_1$, $21_2$ - - - $21_N$ to selectively receive the tapped off predetermined portions of power in the light propagating through the input optical fiber 15.

Delay coils $23_1$, $23_2$ - - - $23_{N-1}$ are respectively interposed between adjacent pairs of the optical couplers $17_1$, $17_2$ - - - $17_N$ (e.g., $17_1$ and $17_2$, $17_2$ and $17_3$, - - - $17_{N-1}$ and $17_N$) to provide a delay time of T between adjacent pairs of interferometric planar hydrophones, namely between $19_1$ and $19_2$, between $19_2$ and $19_3$ - - - and between $19_{N-1}$ and $19_N$.

The portions of light from the interferometric planar hydrophones $19_1$, $19_2$, - - - $19_N$ respectively pass through a series of optical couplers $25_1$, $25_2$ - - - $25_N$, by way of respective connecting optical fibers $27_1$, $27_2$ - - -

$271_N$, to an output optical fiber 29, and form a sequence of light portions separated from each other by the time T. As will be explained, each of the interferometric planar hydrophones is implemented to sense acoustic waves. Thus, this sequence of light portions from the hydrophones $19_1$, $19_2$, - - - $19_N$ is a sequence of time-separated (time-division multiplexed) acoustic signals from the spacially-separated hydrophones $19_1$-$19_N$ which propagates through the output optical fiber 29 to an electronic processing circuit 31.

It should be noted that the interferometric planar hydrophones $19_1$-$19_N$ can be disposed over preselected locations to receive acoustic signals over a preselected area. For purposes of this description N could be equal to any number, for example, between 1 and 100 to achieve a desired area of coverage of, for example, a seawall or a fishing boat.

Figure 1A:
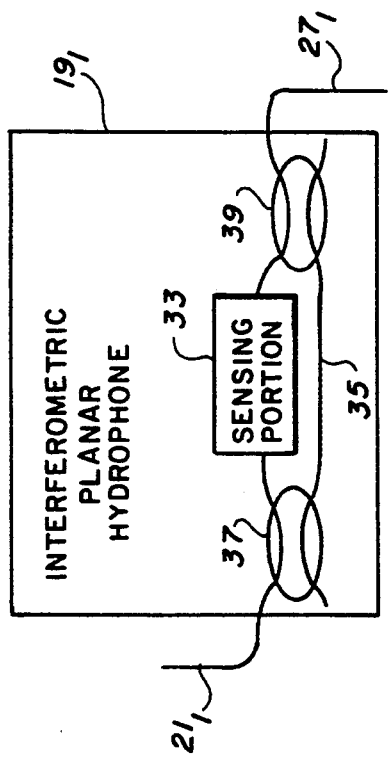
FIG. 1A illustrates in more detail one of the interferometric planar hydrophones of FIG. 1.

Referring now to FIG. 1A, the interferometric planar hydrophone $19_1$ of FIG. 1 will be discussed in more detail. The hydrophone $19_1$ includes a sensing portion 33 for sensing acoustic signals and a reference fiber arm 35, with both the sensing portion 33 and reference fiber arm 35 coupled between an associated input optical coupler 37 and an associated output optical coupler 39. The reference fiber arm 35 is environmentally isolated from perturbations by external factors, particularly acoustic waves or signals. On the other hand, the sensing portion 33 is implemented to monitor environmental conditions or physical phenomena. For purposes of this invention, as stated before, the sensing portion 33 is implemented to monitor acoustic waves.

The interferometric planar hydrophone $19_1$ is implemented to form a Mach Zehnder interferometer to sense acoustic waves. However, it should be understood that other interferometric configurations, such as a Michelson interferometer, could be utilized instead of the Mach Zehnder interferometer configuration. Each of the remaining hydrophones $19_2$-$19_N$ is similar in structure and operation to the hydrophone $19_1$ and, hence, require no further description.

Referring now to both FIGS. 1 and 1A, in one type of operation of the interferometric planar hydrophone system 11, the optical source 13 launches coherent input light through the input optical fiber 15 and into the planar hydrophone $19_1$. This coherent light is split by the input coupler 37 into the sensing portion 33 and the reference fiber arm 35, and then recombined in the output coupler 39 to form an optical output at the output of the output coupler 39. The optical output from the coupler 39 of hydrophone $19_1$ propagates to the next one of the remaining planar hydrophones $19_2$-$19_N$ and operates as the input light thereto, with a similar operation repeating for the hydrophone $19_2$. A similar operation repeats for each of the remaining planar hydrophones $19_3$-$19_N$. Thus, a sequence of time-separated (time-division multiplexed) acoustic signals from the spacially-separated hydrophones $19_1$-$19_N$ is produced at the outputs of the output optical couplers 39 of the planar hydrophones $19_1$-$19_N$ and transmitted through the output optical fiber 29 to the electronic processing circuit 31. The processing circuit 31 typically includes a photodetecter (not shown) to convert the optical signals in the output optical fiber 29 to electrical signals indicative of the cosine of the phase shift differences between the sensing portion 33 and the reference fiber arm 35 to determine the acoustical signals detected by the interferometric planar hydrophones $19_1$-$19_N$, and demodulation electronics (not shown) to produce a sequence of electrical signals directly proportional to the phase shifts produced by the hydrophones $19_1$-$19_N$.

The key part of the invention lies in the sensing portion 33 in each one of the interferometric planar hydrophones $19_1$-$19_N$ of FIG. 1. This sensing portion 33 will be discussed by now referring to FIGS. 2 and 2A.

Figure 2:
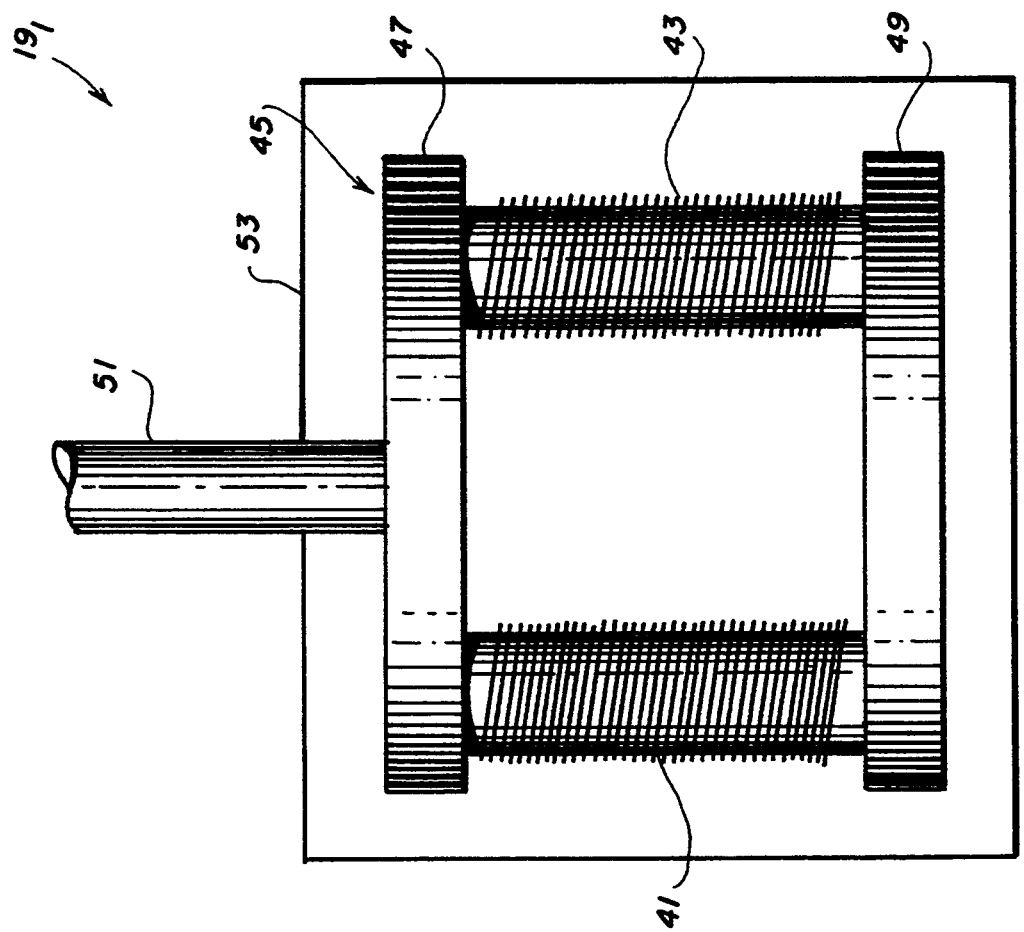
FIG. 2 is a front cross-sectional view of the interferometric planar hydrophone $19_1$ of FIG. 1A.

FIG. 2 illustrates a front cross-sectional view of the exemplary interferometric planar hydrophone $19_1$ of the planar hydrophone system 11 of FIG. 1. More specifically, FIG. 2 shows two exemplary mandrels 41 and 43 substantially mounted, in parallel with respect to each other, into exemplary slots (not shown) in a framework 45 comprised of rigid supports 47 and 49 to form a fixed planar configuration. While only two mandrels 41 and 43 are shown, it should be understood that more than two mandrels, such as three, four or more mandrels, could be mounted in the framework 45. Each of the mandrels 41 and 43 is comprised of a thin-walled, hollow compliant mandrel that is cylindrical, or even elliptical, in shape.

Each of the hollow mandrels 41 and 43 is comprised of a compliant metal, such as aluminum, or a compliant plastic and is filled with a preselected gas, such as air. Each of the supports 47 and 49 can be made from a material such as a magnetic material, brass, aluminum, plastic, or a castable epoxy such as Chockfast Orange ™, manufactured by Philadelphia Resins, Inc.

A cable assembly 51, which includes optical fiber 15, passes into the support 47. The fiber 15 is coupled through the input optical coupler 37 (FIG. 1A) and wound around the mandrel 41 from top to bottom and from the bottom to the top of the mandrel 41, for example, before it is wound around the mandrel 43 in a similar manner. After the fiber 15 is wound around the mandrel 43 it is coupled through the output optical coupler 39 (FIG. 1A) and back into the cable assembly 51. The reference optical fiber 35 (FIG. 1A) is coupled between the input and output optical couplers 37 and 39 to form an interferometer. Then the reference optical fiber 35, the couplers 37 and 39, splices, and/or mirrors used to form the interferometer are potted either inside the mandrels 41 and 43 themselves or in the support structure which holds the mandrels rigidly together. After the interferometer structure is completed, it is completely encapsulated in a protective coating 53 of a polymer, such as polyurethane, or some other castable resin.

It should be noted that there are multiple layers of optical fiber 15 wound around each of the mandrels 41 and 43. While only two layers were discussed above, it should be understood that more than two layers of optical fiber, or even just a single layer of optical fiber, could be wound around each mandrel. It should be emphasized that, since the optical fiber 15 is serially wound around all of the mandrels in an interferometric planar hydrophone, only one sensing arm is derived and, hence each one of the interferometric planar hydrophones $19_1$-$19_N$ forms only one acoustic sensor.

Figure 4:
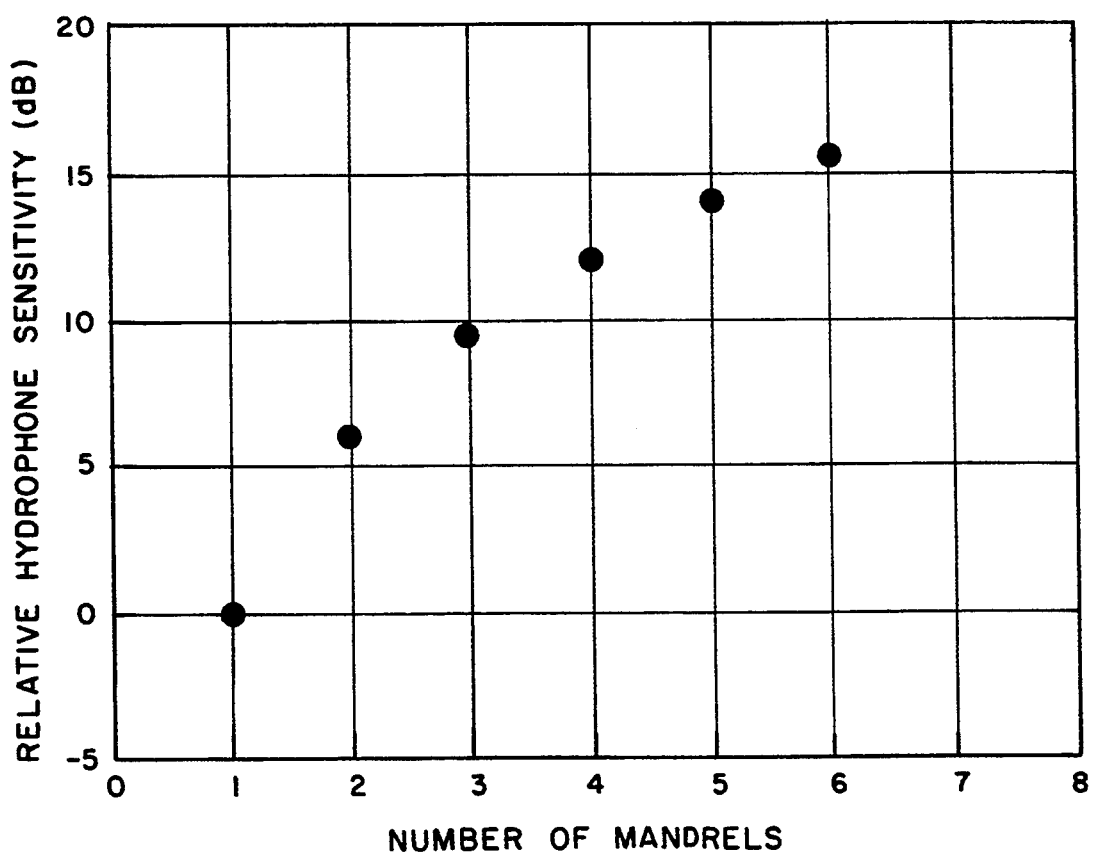
FIG. 4 is a graph which illustrates the relative sensitivity in dB of the interferometric planar hydrophone of the invention as a function of the number of mandrels utilized in the hydrophone.
Figure 5:
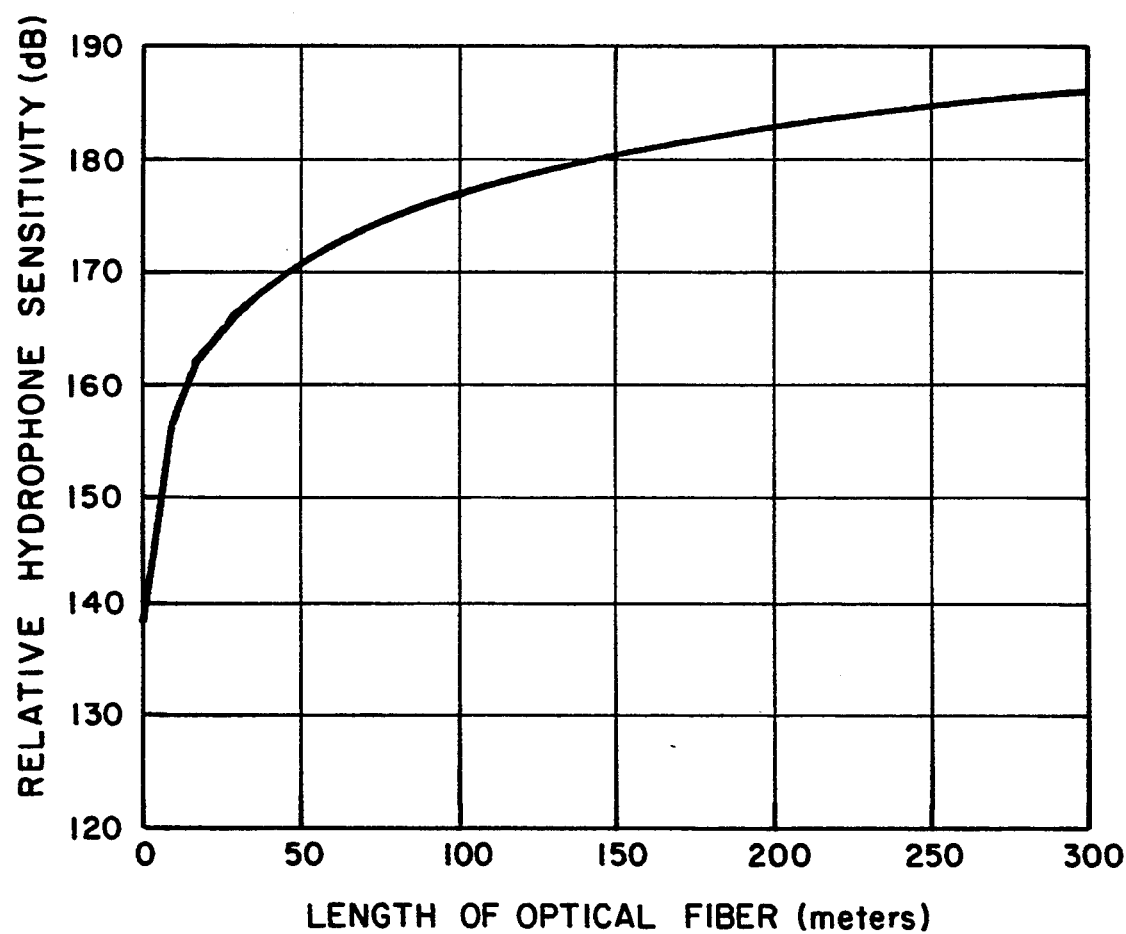
FIG. 5 is a graph which illustrates the relative sensitivity in dB of the interferometric planar hydrophone of the invention as a function of the length of the optical fiber that is serially wound on the mandrels in the hydrophone.

It should be noted that the sensitivity of any given one of the interferometric planar hydrophones $19_1$-$19_N$ could be increased by making the thin outer wall of the mandrel thinner, by increasing the number of mandrels in a planar hydrophone (See FIG. 4), and by increasing the length of the optical fiber on each of the mandrels in a planar hydrophone (See FIG. 5).

Figure 2A:
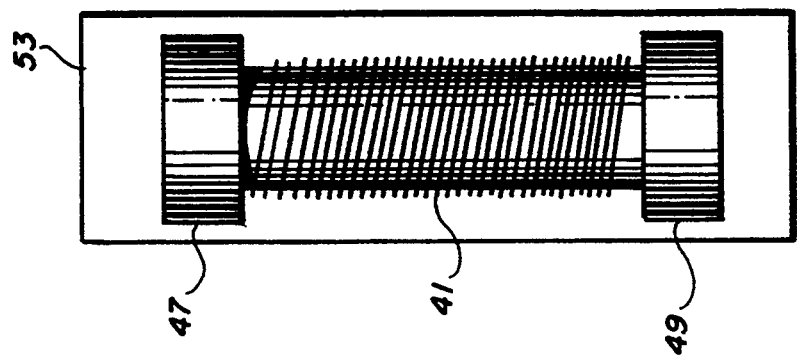
FIG. 2A is a side cross-sectional view of the interferometric planar hydrophone $19_1$ of FIG. 2.

FIG. 2A is a side cross-sectional view of the interferometric planar hydrophone $19_1$ of FIG. 2. Note that an exemplary ⅜ inch thickness for the hydrophone $19_1$ is shown in FIG. 2A, whereas FIG. 2 shows an exemplary 4 inch width and an exemplary 4 inch height for the hydrophone $19_1$. Thus, the thickness of the hydrophone $19_1$ of FIG. 2A is much less than either of the other two dimensions of the hydrophone $19_1$ of FIG. 2. This is why the hydrophone $19_1$, as well as the hydrophones $19_2$-$19_N$, are designated as "planar hydrophones".

Figure 3:
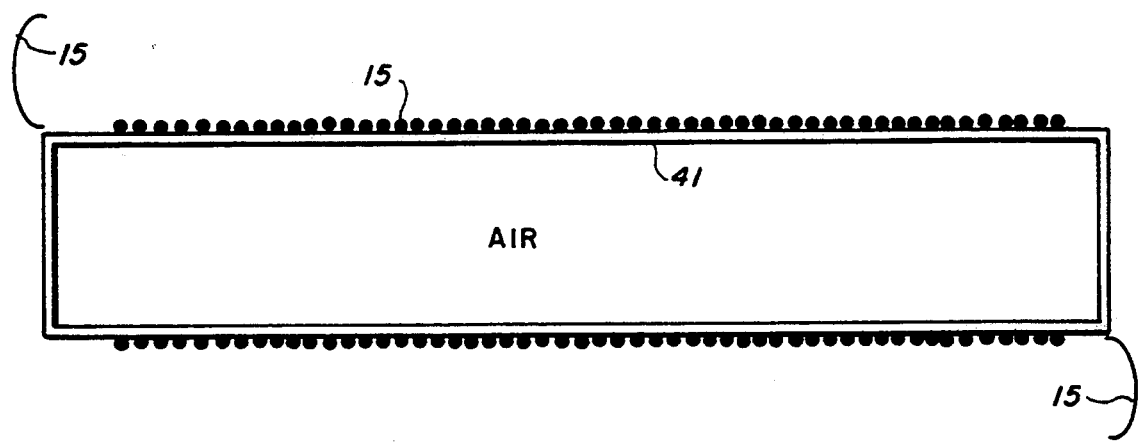
FIG. 3 illustrates a front cross-sectional view of one of the air-backed mandrels shown in FIG. 2.

FIG. 3 shows a front cross-sectional view of one of the air-backed mandrels shown in FIG. 2. The optical fiber 15, from the input optical coupler 37, is shown wrapped around, for example, the mandrel 41. For the sake of clarity, only one layer of optical fiber 15 is shown wrapped around the mandrel 41. As indicated before the mandrel 41 is a closed, thin-walled hollow tube that is filled with air, for example. Although not shown, the couplers 37 and 39 (FIG. 1A) can be placed inside of the mandrel 41 to protect them from damage.

FIG. 4 is a graph which illustrates the relative sensitivity in dB of the interferometric planar hydrophone of the invention as a function of the number of mandrels utilized in the hydrophone. As shown in the graph of FIG. 4, the relative hydrophone sensitivity in dB of any given one of the interferometric planar hydrophones $19_1$-$19_N$ of FIG. 1 increases as a direct function of the number of mandrels utilized in that planar hydrophone.

FIG. 5 is a graph which illustrates the relative sensitivity in dB of the interferometric planar hydrophone of the invention as a function of the length of the optical fiber that is serially wound on the mandrels in the hydrophone. As shown in the graph of FIG. 5, the relative hydrophone sensitivity in dB of any given one of the interferometric planar hydrophones $19_1$-$19_N$ of FIG. 1 increases as a direct function of the total length in meters of the optical fiber wound around the mandrels utilized in the sensing portion of that planar hydrophone.

Therefore, what has been described in a preferred embodiment of the invention is a sensing portion for an interferometric planar hydrophone which comprises: a support assembly; a plurality of hollow compliant mandrels mounted to the support assembly in a fixed planar relationship with respect to each other to form a planar configuration; a sensing optical fiber sequentially wound around each of the plurality of mandrels to form a single, serial, optical sensing arm or path between an input position on a first one of the plurality of mandrels and an output position on a last one of the plurality of mandrels; and an acoustically transparent material encapsulating the sensing portion to form a sealed compliant planar hydrophone.

In an operational system, an interferometric planar hydrophone system is disclosed which comprises: the sensing portion in which the sensing arm is operative to measure acoustic signals in a preselected environment and which sensing portion further includes a reference optical fiber environmentally isolated from the acoustic signals; a light source for transmitting coherent light to both of the sensing and reference optical fibers; and circuitry responsive to light received from the sensing and reference optical fibers for developing an output signal indicative of phase shift differences between the sensing and reference optical fibers to determine the acoustic signals being measured.

There are several advantages of the invention over the prior art planar hydrophones, which use an encapsulation material, which is generally some type of polyurethane, as the acoustic transduction mechanism.

First, the hydrophone transduction mechanism of the invention is based on the compression of an exemplary thin-walled hollow metal tube filled with air. The acoustic sensitivity of such a device does not vary as a function of temperature because the compressibility of air within the thin-walled hollow metal tube does not vary strongly with temperature over the required operational temperature range of the hydrophone. Also, the response of the metal forming the air-backed mandrels is very stable as a function of temperature. The air-filled transduction mechanism also gives these hydrophones a higher acoustic sensitivity than those planar hydrophones that utilize a solid encapsulant as the transduction mechanism. This higher sensitivity overcomes any residual effects of the encapsulant when the hydrophone is covered with with at least one protective coating.

A second advantage lies in the area of acceleration sensitivity. Devices using the bulk modulus of the encapsulant material as the transduction mechanism have high acceleration sensitivity due to Poisson ratio effects. In this new device the transduction is based on an air-backed mechanism. Thus, the encapsulant material can be optimized to minimize the acceleration response without incurring problems with the acoustic response.

A third advantage lies in the utilization of a sensing portion that is comprised of an optical fiber that is serially wound around a plurality of mandrels. The longer length of optical fiber that can be utilized in the sensing portion of the planar hydrophone increases the sensitivity of the hydrophone.

It should therefore readily be understood that many modifications and variations of the present invention are possible within the purview of the claimed invention. For example, planar hydrophones may be formed by connecting the air-backed mandrels in configurations other than parallel to each other, such as, for example, in square or triangular configurations. Furthermore, more than two thin-walled hollow mandels may be utilized in a hydrophone, with each mandrel being comprised of a compliant metal or a compliant plastic. It should also be understood that the exemplary system embodiment of the invention that was described above is only one of many possible ways of interrogating an array of the hydrophones of the invention. Other ways include frequency division multiplexing, wavelength division multiplexing, other ways of time division multiplexing, and any combination thereof. It is therefore to be understood that, within the scope of the appended claims, the invention may be practiced otherwise than as specifically described.

What is claimed and desired to be secured by Letters Patent of the United States is:

1. In an interferometric planar hydrophone having a plane, a sensing portion of the interferometric planar hydrophone comprising:
   a support assembly comprised of first and second substantially parallel support members substantially parallel to the plane of the planar hydrophone and adaptable to be mounted on a surface;
   a plurality of hollow compliant mandrels, each of said hollow compliant mandrels having a longitudinal axis and being mounted between said first and second support members of said support assembly such that their longitudinal axes are substantially parallel to each other and to the plane of the planar hydrophone in a fixed relationship with respect to each other to form a planar configuration;

a sensing optical fiber sequentially wound around each of said plurality of mandrels to form a single, serial, optical sensing path between an input position on a first one of said plurality of mandrels and an output position on a last one of said plurality of mandrels; and an acoustically transparent material encapsulating said plurality of fiber-wound mandrels mounted to said support assembly to form a sealed compliant unit.

2. The sensing portion of claim 1 wherein each of said plurality of hollow compliant mandrels is comprised of a compliant metal.

3. The sensing portion of claim 1 wherein each of said plurality of hollow compliant mandrels is comprised of plastic.

4. The sensing portion of claim 1 wherein each of said plurality of hollow compliant mandrels is substantially cylindrical in shape.

5. The sensing portion of claim 1 wherein said first and second support members of said support assembly hold said plurality of hollow compliant mandrels in a fixed planar relationship with respect to each other.

6. The sensing portion of claim 5 wherein each of said first and second support members is made from a rigid material.

7. The sensing portion of claim 1 wherein each of said plurality of hollow compliant mandrels is filled with gas.

8. The sensing portion of claim 1 wherein each of said plurality of hollow compliant mandrels is filled with air.

9. The sensing portion of claim 1 wherein said acoustically transparent material is a polymer.

10. The sensing portion of claim 9 wherein said polymer is polyurethane.

11. An interferometric planar hydrophone having a plane and comprising:
a source for providing coherent light;
a detector;
a sensing portion comprising: a support assembly comprised of first and second substantially parallel support members substantially parallel to the plane of the planar hydrophone and adaptable to be mounted on a surface; a plurality of hollow compliant mandrels, each of said hollow compliant mandrels having a longitudinal axis and being mounted between said first and second support members of said support assembly such that their longitudinal axes are substantially parallel to each other and to the plane of the planar hydrophone in a fixed relationship with respect to each other to form a planar configuration; a sensing optical fiber sequentially wound around each of said plurality of mandrels to form a single, serial, optical sensing path between an input position on a first one of said plurality of mandrels and an output position on a last one of said plurality of mandrels; and an acoustically transparent material encapsulating said plurality of fiber-wound mandrels mounted to said support assembly to form a sealed compliant planar hydrophone;
an input optical fiber coupled between said light source and said sensing portion; and
an output optical-fiber coupled between said sensing portion and said detector.

12. The interferometric planar hydrophone of claim 11 wherein said sensing portion further includes a reference optical fiber coupled to said input and output optical fibers and environmentally isolated from said sensing optical fiber.

13. The interferometric planar hydrophone of claim 12 wherein said reference optical fiber is encapsulated by said acoustically transparent material.

14. An interferometric planar hydrophone system comprising:
an interferometric planar hydrophone having a plane and comprising:
a rigid support assembly comprised of first and second substantially parallel support members substantially parallel to the plane of said planar hydrophone and adaptable to be mounted on a surface;
a plurality of hollow compliant mandrels, each of said hollow compliant mandrels having a longitudinel axis and being mounted between said first and second support members of said support assembly such that their longitudinal axes are substantially parallel to each other and to the plane of the planar hydrophone system in a fixed relationship with respect to each other to form a planar configuration;
a sensing optical fiber sequentially wound around each of said plurality of mandrels to form a single, serial, optical sensing arm between an input position on a first one of said plurality of mandrels and an output position on a last one of said plurality of mandrels, said sensing arm being operative to measure a predetermined measurand in a preselected environment;
a reference optical fiber environmentally isolated from the predetermined measurand; and
an acoustically transparent material encapsulating said rigid support assembly, said plurality of hollow compliant mandrels, and said sensing and reference optical fibers to form a sealed compliant planar hydrophone;
light source means for transmitting coherent light to both of said sensing and reference optical fibers; and
means responsive to light received from said sensing and reference optical fibers for developing an output signal indicative of phase shift differences between said sensing and reference optical fibers to determine the predetermined measurand.

15. The interferometric planar hydrophone of claim 14 wherein said reference optical fiber is substantially disposed in a location selected from the group consisting of inside said support assembly, inside at least one of said pluratity of hollow compliant mandrels and inside a combination thereof.

16. The interferometric planar hydrophone of claim 14 wherein each of said plurality of hollow compliant mandrels is comprised of metal.

17. The interferometric planar hydrophone of claim 14 wherein said sensing optical fiber sequentially wound around each of said plurality of mandrels and said reference optical fiber in combination substantially form a Mach-Zehnder interferometer.

18. The interferometric planar hydrophone of claim 14 wherein each of said plurality of hollow compliant mandrels is comprised of plastic.

19. The interferometric planar hydrophone of claim 14 wherein each of said plurality of hollow compliant mandrels is filled with gas.

20. The interferometric planar hydrophone of claim 14 wherein each of said plurality of hollow compliant mandrels is filled with air.

21. In an interferometric planar hydrophone having a plane, a sensing portion of the interferometric planar hydrophone comprising:
- a support assembly comprised of a plurality of support members substantially parallel to the plane of the planar hydrophone and adaptable to be mounted on a surface;
- a plurality of hollow compliant mandrels, each of said hollow compliant mandrels having a longitudinal axis and being selectively mounted to said plurality of support members of said support assembly such that their longitudinal axes are substantially parallel to the plane of the planar hydrophone in a fixed planar relationship to form a planar configuration;
- a sensing optical fiber sequentially wound around each of said plurality of mandrels to form a single, serial, optical sensing path between an input position on a first one of said plurality of mandrels and an output position on a last one of said plurality of mandrels; and
- an acoustically transparent material encapsulating said plurality of fiber-wound mandrels mounted to said support assembly to form a sealed compliant unit.

* * * * *